United States Patent [19]

Doyle et al.

[11] Patent Number: 4,895,419

[45] Date of Patent: Jan. 23, 1990

[54] CONTACT COPYING OF REFLECTION OR VOLUME HOLOGRAMS

[75] Inventors: James Doyle, Wilmslow; Anthony I. Hopwood, Halton; Alan Adshead, New Mills, all of England

[73] Assignee: Ciba-Geigy Corporation, Ardsley, N.Y.

[21] Appl. No.: 308,662

[22] Filed: Feb. 10, 1989

[30] Foreign Application Priority Data

Feb. 12, 1988 [GB] United Kingdom ............... 8803283

[51] Int. Cl.⁴ .............................................. G03H 1/20
[52] U.S. Cl. .................................... 350/3.69; 350/3.71
[58] Field of Search ...................... 350/3.69, 3.7, 3.71, 350/3.81

[56] References Cited

U.S. PATENT DOCUMENTS

| | | | |
|---|---|---|---|
| 3,600,056 | 8/1971 | King, Jr. ............................ | 350/3.69 |
| 3,647,289 | 3/1972 | Weber .............................. | 350/3.69 |
| 4,235,505 | 11/1980 | Hariharan et al. ................. | 350/3.77 |
| 4,378,142 | 3/1983 | Ono .................................. | 350/3.71 |
| 4,610,499 | 9/1986 | Chern et al. ....................... | 350/3.7 |
| 4,712,852 | 12/1987 | Funato et al. ..................... | 350/3.71 |

FOREIGN PATENT DOCUMENTS

| | | |
|---|---|---|
| 0036298 | 9/1981 | European Pat. Off. . |
| 0128033 | 12/1984 | European Pat. Off. . |
| 0087281 | 6/1987 | European Pat. Off. . |
| 58-115469 | 7/1983 | Japan . |
| 1278672 | 6/1972 | United Kingdom . |
| 2159979 | 12/1985 | United Kingdom . |

OTHER PUBLICATIONS

Von A. W. Pressdee, "Holografische Kopien sind falschungssicher", 2253 *Laser und Optoelektronik*, 18 (1986) Mar., No. 1.
Ser. No. 697,792, filed 04/15/1969, Harper et al., Defensive Publication.
Par Y. Belvaux, "Duplication des Hologrammes", *Annales De Radioelectricite*, T. XXII., No. 88, Apr. 22, 1967.
"Preparation of Reflection Holograms by Interference Copying of Transmission Holograms", V. A. Vanin, 2287 Soviet J of Quantum Electronics, vol. 8, No. 7 (1978.07) New York.
Patent Abstract of Japan, vol 8, No. 31, Feb. 9, 1984.
Patent Abstract of Japan, vol. 10, No. 19, Jan. 24, 1986.

*Primary Examiner*—Bruce Y. Arnold
*Assistant Examiner*—Terry S. Callaghan
*Attorney, Agent, or Firm*—Burns, Doane Swecker & Mathis

[57] ABSTRACT

A method of preparing a reflection hologram which includes mounting a transmission hologram in register with a portion of transparent photosensitive holographic material there being present there between a filter to cut out zero order light transmitted through the transmission hologram, there being present on each side of an assembly which includes the hologram and the holographic material a light reflecting surface then causing a beam of light from a laser source to pass through a holographic optical element (H.O.E.) which splits the beam into two beams and causes both beams to scan in register over both the whole surface of the transmission hologram and the holographic material by directing the beams onto both reflecting surfaces so that one beam is reflected from one said reflecting surface and on passing through the transmission hologram takes-up the image information and passes through the filter to cut out the zero order light to the portion of transparent photosensitive holographic material where it interferes with the other beam which is reflected from the other reflecting surface into the holographic material then processing the holographic material to fix the holographic image therein.

24 Claims, 2 Drawing Sheets

CONTACT COPYING OF REFLECTION OR VOLUME HOLOGRAMS

BACKGROUND OF THE INVENTION

This invention relates to contact copying of reflection or volume holograms.

In the mass production of reflection or volume holograms it is usual to prepare a transmission master hologram of an object and from this to prepare a copy reflection master hologram and from the reflection master hologram to prepare by contact copying a large number of reflection holograms. Such contact copying is usually accomplished by placing in register the reflection master hologram and a sheet of transparent photosensitive holographic material. An overall exposure to laser light is then used to form a holographic copy image in the photosensitive material. However, unless a very high power laser is used to effect such an overall exposure, a comparatively long exposure time is required. During this time often the holographic material and the hologram alter their relative position and a hologram with unclear fringes is obtained. To overcome the need to use a long exposure time it has been proposed to employ a scanning method wherein a dot of high intensity laser light raster is employed or a narrow line of lower intensity laser light is linearly scanned so as to sweep out a rectangular area of exposure of the holographic material through the hologram. A scanning method of this type reduces very greatly the exposure time required but it is cumbersome and expensive to set up such a scanning system. In addition, the use of a reflection hologram as the master from which the copies are made has four serious disadvantages:

(i) the master hologram reflects a constant fraction of the light incident as it is in a given environment. Thus there can be no control over the reference to object beam intensity ratio hereinafter referred to as the beam ratio, a parameter which significantly affects the brightness of the final image.

(ii) in order to achieve sufficient reflectivity for good copying the wavelength of maximum reflectivity of the reflection master must closely match the wavelength of the copying laser. This can often require control of complicated swelling processes in order to compensate for shrinkages in the reflection master material during processing or for differences in wavelength between the laser used for recording the transmission master and the laser used for copying.

(iii) as the relative humidity changes a standard reflection master changes its reconstruction wavelength. The reflectivity at the laser wavelength changes, and consequently the brightness of the copy changes. To overcome this instability may require considerable expenditure on air conditioning equipment.

(iv) shifts in the replay wavelength during the copying process can adversely affect the reference angle required for replay of the copy and the viewing angle of the copy.

There is limited scope to correct these defects. A scanning system to provide holograms is described for example in British patent application Ser. No. 2159979 but this does not appear to be a copy system. A scanning system to provide a transmission hologram from a transmission master by a scanning system is described in Japanese patent application Ser. No. 56-215101 but in this case the transmission copy is a surface relief type hologram on a resin plate and not a light-transmissive holographic copy.

On the other hand the use of a transmission hologram as the contact master has no such disadvantages. When using a transmission hologram as the master from which to produce reflection copies the beam ratio can be controlled and compensation can be made for material shrinkages or differences in laser wavelength by adjustment of the angles of incidence and intensity of the beam used to replay the transmission master and/or the copying reference beam.

Various methods for preparing a reflection copy from a transmission master have been proposed but in these methods a single overall exposure is postulated and not a scanning exposure. One such prior art proposal is described in the Annales de Radioelectricite No. 88 Apr. 1967 on pages 105-108. The details given in this short article are limited but it is proposed that a split beam from a laser strikes two reflecting surfaces to expose the holographic material via the transmission master.

Another such prior art proposal is described in U.S. Pat. No. 3647289 wherein an improved copy reflection hologram is obtained from a master transmission hologram using a single overall exposure by placing between the holographic material and the transmission master means to cut out the zero order light (or the undiffracted beam). But the system described in U.S. Pat. No. 3647289 is not a scanning system.

SUMMARY OF THE INVENTION

We have found a method of preparing reflection holograms from a transmission master using a scanning system which is simple to operate and which provides very good quality reflection holograms.

According to the present invention there is provided a method of preparing a reflection hologram which comprises mounting a transmission hologram in register with a portion of transparent photosensitive holographic material there being present there between means to cut out zero order light transmitted through the transmission hologram, there being present on each side of the assembly which comprises the hologram and the holographic material a light reflecting surface, then causing a beam of light from a laser source to pass through a holographic optical element (H.O.E.) which splits the beam into two beams and causes both beams to scan in register over both the whole surface of the transmission hologram and the holographic material by directing the beams on to both reflecting surfaces so that one beam is reflected from one said reflecting surface and on passing through the transmission hologram takes-up the image information and passes through the means to cut out the zero order light to the portion of transparent photosensitive holographic material where it interferes with the other beam which is reflected from the other reflecting surface in to the holographic material then processing the holographic material to fix the holographic image therein.

The term reflection hologram includes display holograms and holographic optical elements for example such elements as used in head-up displays.

Preferably the holographic optical element is a diffraction grating and when such a diffraction grating is moved relative to the laser beam two scanning beams are produced which are directed on to the reflecting surfaces to scan over them in register.

Such a transmission holographic diffraction grating may be in the form of a strip or preferably in the form of a rotatable disk. The two scanning beams scan across the length of the holographic material and the hologram and in order to scan their width the angle at which the laser beam strikes the reflecting surfaces must be continuously altered. This may be accomplished either by moving the laser relative to the diffraction grating or if the diffraction grating is a rotatable disk altering the grating spacing on the part of the disk presented to the laser beam from the laser source.

Preferably the diffraction grating is in the form of a disk wherein individual gratings are arranged as sectors of an annulus. Most preferably the spacings of these gratings vary continuously in a circumferential direction so that an incident laser beam when diffracted by the rotating disk scans the entire length of the holographic material and the hologram.

When using a disk of this type it is possible to avoid the need for relative movement between the laser source and the rotating disk by providing cylindrical optics to produce a collimated slit of light or shallow beam, which in cross section is wider than it is high, and to pass this through the grating. This will form two shallow beams of light which can be of sufficient width so when they reach the hologram and the holographic material they are wide enough to cover their widths. In this case a single rotation of the disk causes the whole surface of both the holographic material and the hologram to be scanned.

In order for this to be achieved, preferably the shallow beam of laser light is aligned with the long dimension of its cross section coincident with a radius of the disk.

However spot scanning can also be employed.

In a further method the H.O.E. used is in strip form. A laser beam is passed through this element to produce a horizontal scan across the length of the material. The vertical scan across the width of the material is produced by moving the laser beam source relative to the H.O.E.

If it is desired to maintain a constant reference beam and replay beam angle during the scanning step this may be achieved by use of a H.O.E. placed between the reflecting surfaces and the assembly of holographic material and hologram. These H.O.E.s have a gradation of fringe spacings which vary continuously along their length so as to compensate for the variable angle incidence of the scanning beam. The emergent beams after diffraction through these H.O.E.s scan across the assembly at a constant angle.

In the method of the present invention preferably the means to cut out the zero order light transmitted through the transmission hologram is a louvre filter. Another means for cutting out the zero order light is a high efficiency H.O.E. or a thin film interference filter.

A suitable high quality louvre can be produced by exposure of photographic film to an X ray source through a pre-prepared grid of material substantially opaque to X rays followed by monochrome photographic development. Such grids can be in the form of parallel lines running in a single direction or a pattern of parallel lines intersecting to form rectangular parallelogram or trigonal grids. Spacing of the grids can be constant, continuously variable or discontinuously variable. The pre-prepared grid is preferably formed from photolithographic materials and X ray opacity may be enhanced by physical development of a suitable heavy metal onto the grid.

The angle of maximum transmission of the louvre may be controlled by changing the shadowing angle of the X-ray exposure.

The angular selectivity of the louvre may be controlled by changing the ratio of the grid spacing to the depth of the photographic recording emulsion. The grid can be vibrated during the exposure to prevent shadows of the louvre lines being cast.

In the method of the present invention preferably the light reflecting surfaces are mirrors which may be planar or curved.

Preferably there is present in the path of the split beam which passes into holographic material immediately before reflection from the reflecting surface means to attenuate the beam to allow beam ratio control.

This can be in the form of a variable neutral density filter. This allows the ratio between the strength of replay beam and the object beam to be altered to produce the brightest copy hologram without image distortion from the object beam intensity locally exceeding the reference beam intensity. Further means can be provided to detect the brightness of the reconstructed image from the transmission master. This could allow any slight effects on the master from the ambient relative humidity to be negated automatically by use of the beam attenuating means.

Any transparent photosensitive holographic material may be used for example silver halide material, dichromated gelatin or photopolymer material. The processing may be carried out in the usual way for the type of holographic material employed.

Any type of laser normally used to prepare holograms may be used for example He: Ne or argon ion lasers.

The method of the present invention is particularly adapted to be used in an apparatus of the type described in European patent application Ser. No. 106607 wherein the photosensitive holographic material is in the form of a long length film and successive portions of the film are exposed. Spool means are provided from which the unexposed film is unwound and onto which the exposed film is wound together with means to move the length of film intermittently so as to expose successive portions thereof.

BRIEF DESCRIPTION OF THE DRAWING

The accompanying drawings will serve to illustrate the invention.

DETAILED DESCRIPTION OF THE PREFERRED EMBODIMENTS

Figure 1:
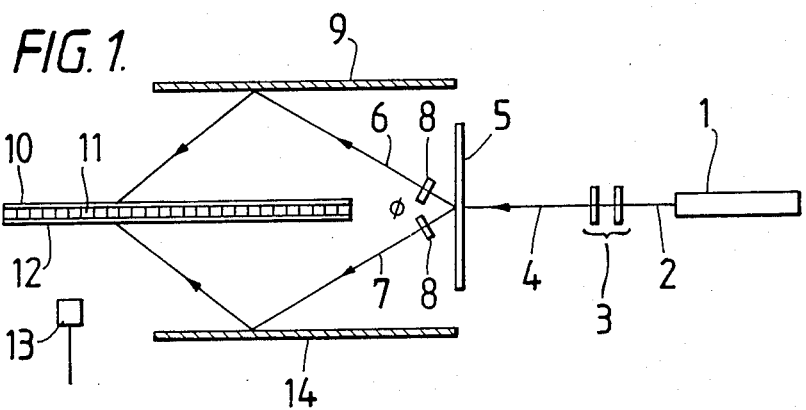
FIG. 1 is a diagramatic side view of the hardware and optics as laid out to perform the method of the present invention wherein the holographic material is scanned.

In FIG. 1. A He:Ne laser source 1 produces a laser beam 2 which is directed through elongating optical elements 3 which form a shallow laser beam 4. The beam 4 is passed through a rotatable holographic optical element (H.O.E.) 5 which splits the beam into two shallow, first order, diffracted, beams 6 and 7. Beam 6 is directed towards a silvered mirror 9 via a beam attenuating means 8 and is reflected therefrom through a transmission hologram 10 and then via a louvre filter 11 into a sheet of silver halide sensitised holographic film material 12. Beam 7 is directed towards a silvered mirror 14 via a beam attenuating means 8 and is reflected therefrom into the holographic film material 12 where it interferes with the beam 6. Beam 7 can be considered to be the reference beam and the beam 6 can be considered to be the replay beam. The beams 6 and 7 are in register the whole time that they interfere with each other in the holographic material. Where they interfere interference fringes are formed which can be fixed by processing the holographic film material in a silver halide developing solution and then either in a solvent bleach solution or in a rehalogenating bleach solution to form in the fringes an imagewise distribution of unexposed silver halide which modulates the replay light to form on reconstruction a holographic image.

Both beam 6 and 7 are elongated by the optical elements 3 to be sufficiently wide to cover the whole widths of the transmission hologram 10 and the holographic material 12. At the beginning of the operation the beam 7 diffracted by the H.O.E. 5 falls as a shallow strip of laser light across one end of the film 12 and beam 6 falls as a corresponding narrow beam of laser light across the same end of the transmission hologram 10 and the beams interfere in the film 12.

Then as H.O.E. 5 rotates the narrow strips of light move up or down the transmission hologram 10 and film 12 (depending on which end was scanned first) until the whole surface of both the hologram 10 and the film 12 have been scanned by the laser light in strip form. The H.O.E. 5 comprises sufficient transmission gratings to ensure that one rotation of the H.O.E. 5 is sufficient to scan the whole of the surface of hologram 10 and film 12. Detector 13 monitors the brightness of the image light which can vary with the ambient humidity and via the beam attenuating means 8 this brightness is maintained at a constant level or at any desired level.

Registration and path length of the scanning beams 6 and 7 can be controlled by vertical and tilt adjustments to mirrors 9 and 14.

The angle of diffraction in each transmission grating elements of HOE 5 alters in a manner to cause the shallow strips of light to sequentially scan portions of the hologram 10 and the film 12 and thereby to cause the area of exposure to move up or down the assembly of 10 and 12.

Preferably, the narrow strips slightly overlap as they scan the hologram and the film to ensure that the whole surface of both sheets have been scanned.

After the scanning of film 12 has been completed the exposed area of film 12 can be removed and processed to fix the holographic image fringes therein and another area of film 12 put in its place and the scanning process repeated.

Figure 2:
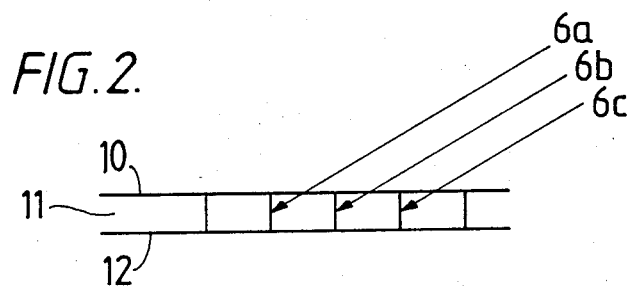
FIG. 2 is an enlarged view of part of the system shown in FIG. 1 to show the action of the louvre filter.

FIG. 2 shows part of the hologram 10 and the film 12 with a louvre filter 11 there between. The arrows 6a, 6b, 6c represent the narrow strips of light which are beam 6 as it scans the hologram 10. The figure shows how the vertical portion of the louvre filter 11 cuts out the zero order part of the beams.

Figure 3:
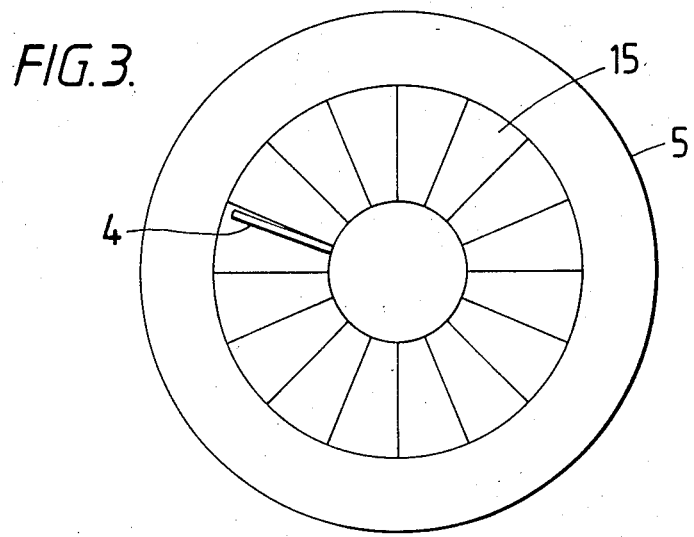
FIG. 3 is a top plan view of the H.O.E. used in FIG. 1.

FIG. 3 shows the diffraction gratings 15 placed as sectors in the H.O.E. 5.

Figure 4:
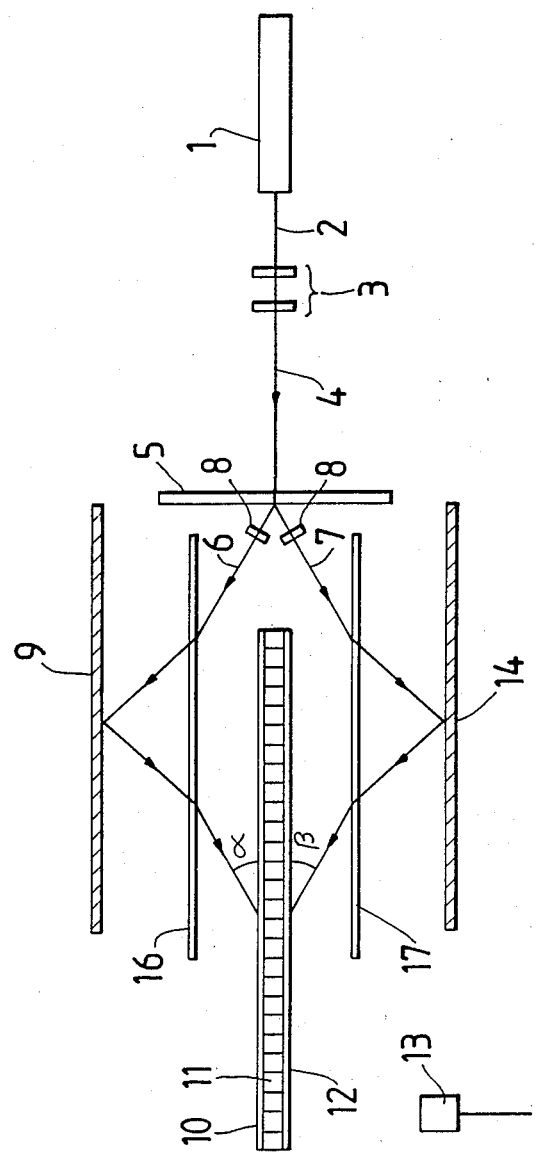
FIG. 4 shows the same view as FIG. 1 with two additional H.O.E.'s in the light path.

FIG. 4 shows the same view as FIG. 1 with H.O.E. 16 placed below mirror 9 and H.O.E. 17 placed above mirror 14. H.O.E.'s 16 and 17 have a gradation of fringe spacings which vary continuously across their length in such a way as to compensate for the variable angle of incidence of the beams 6 and 7 reflected from the mirrors 9 and 14. The emergent beams from H.O.E.'s 16 and 17 scan the hologram 10 and the film 12 at constant angles $\alpha$ and $\beta$ which need not be the same.

Alternatively instead of HOE's 16 and 17 collimating lenses can be present in the path of beams 6 and 7 to ensure that the beams strike mirrors 9 and 14 at a constant angle.

What is claimed is:

1. A method of preparing a copy reflection hologram which comprises the steps of:
    forming an assembly by mounting a transmission hologram in register with a portion of light transparent photosensitive holographic material;
    cutting-out zero order light transmitted through the transmission hologram using means for this function present between the transmission hologram and the holographic material, there being present on each side of the assembly which comprises the hologram and the holographic material a light reflecting surface;
    subsequently causing a beam of light from a laser source to pass through a holographic optical element (H.O.E.) which splits the beam into two beams and causes both beams to scan in register over both the whole surface of the transmission hologram and the holographic material by directing the beams onto both reflecting surfaces so that one beam is reflected from one of said reflecting surfaces and, on passing through the transmission hologram, takes-up the image information and passes through the means to cut out the zero order light to the portion of transparent photosensitive holographic material where it interferes with the other beam which is reflected from the other reflecting surface into the holographic material, the two split portions of the beam being maintained in registration; and,
    subsequently processing the holographic material to fix the holographic image therein.

2. A method according to claim 1 wherein the step of causing the laser beam to scan further includes moving a transmission holographic diffraction grating relative to the laser beam.

3. A method according to claim 2 wherein the diffraction grating is in the form of a strip, said step of causing the laser beam to scan including moving said strip relative to the laser beam.

4. A method according to claim 2 wherein the diffraction grating is in the form of a rotating disk wherein the individual gratings are arranged as sectors of an annulus wherein spacings of these gratings vary continuously in a circumferential direction so that said step of causing the laser beam to scan further includes diffracting an incident laser beam by the rotating disk to perform repeat scans.

5. A method according to claim 4 further comprising the step of passing the laser beam before it reaches the grating through cylindrical optics which converts it into a shallow beam of light.

6. A method according to claim 5 further comprising the step of aligning the shallow beam of laser light with the long direction of its cross section coincident with a radius of the disk.

7. A method according to claim 1 further comprising the step of adjusting the angle of the scanning beams by the presence of a holographic optical element between either one or both reflecting surfaces and the assembly.

8. A method according to claim 1 wherein the step of cutting out the zero order light transmitted through the transmission hologram includes using a louvre filter.

9. A method according to claim 1 wherein the step of cutting out the zero order light includes using a H.O.E.

10. A method according to claim 1 further comprising the step of attenuating the split beam which passes into the holographic material to allow beam ratio control.

11. A method according to claim 1 wherein the light reflecting surfaces are plane mirrors.

12. A method according to claim 1 further comprising the step of adjusting the scanning beam by use of a curved mirror.

13. A device for preparing a copy reflection hologram which comprises:
   an assembly which has in register a transmission hologram and a portion of light transparent photosensitive holographic material, there being present therebetween means to cut out zero order light transmitted through the transmission hologram;
   a light reflecting surface on each side of the said assembly;
   a source of laser light;
   a holographic optical element to split the laser light into two beams and cause the two beams to scan in register over the whole surface of each side of the said assembly after reflection from the said reflecting surfaces.

14. A device according to claim 13 wherein the holographic optical element is a transmission holographic diffraction grating which is movable relative to the laser beam.

15. A device according to claim 14 wherein the diffraction grating is a rotatable disk having gratings arranged as sectors of an annulus and wherein the spacings of these gratings vary continuously in a circumferential direction.

16. A device according to claim 15 further comprising cylindrical optics placed in the path of the beam of laser light before the beam reaches the disk.

17. A device according to claim 13 wherein the means to cut-out the zero order light is a louvre filter.

18. A device according to claim 17 wherein there is present in the path of the laser beam which passes into the holographic material means to attenuate the beam to allow beam ratio control.

19. A device according to claim 18 wherein the means to attenuate the beam is a variable neutral density filter.

20. A device according to claim 13 wherein the means to cut-out the zero order light is a holographic optical element.

21. A device according to claim 13 further comprising a detector for monitoring the brightness of image light.

22. A device according to claim 13 wherein the holographic material is a long length of film successive portions of which are exposed.

23. A device according to claim 22 wherein there is present a spool on which unexposed film is reeled, a spool on which exposed film is reeled and means to cause the length of film to be advanced by a predetermined length after each exposure.

24. A hologram prepared in accordance with a method consisting of the steps of:
   forming an assembly by mounting a transmission hologram in register with a portion of light transparent photosensitive holographic material;
   cutting-out zero order light transmitted through the transmission hologram using means for this function present between the transmission hologram and the holographic material, there being present on each side of the assembly which comprises the hologram and the holographic material a light reflecting surface;
   subsequently causing a beam of light from a laser source to pass through a holographic optical element (H.O.E.) which splits the beam into two beams and causes both beams to scan in register over both the whole surface of the transmission hologram and the holographic material by directing the beams onto both reflecting surfaces so that one beam is reflected from one of said reflecting surfaces and on passing through the transmission hologram takes-up the image information and passes through the means to cut out the zero order light to the portion of transparent photosensitive holographic material where it interferes with the other beam which is reflected from the other reflecting surface into the holographic material, the two split portions of the beam being maintained in registration; and,
   subsequently processing the holographic material to fix the holographic image therein.

* * * * *